United States Patent
McCaffrey (10) Patent No.: US 10,822,964 B2
(45) Date of Patent: Nov. 3, 2020

(54) BLADE OUTER AIR SEAL WITH NON-LINEAR RESPONSE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 96 days.

(21) Appl. No.: 16/189,233

(22) Filed: Nov. 13, 2018

(65) Prior Publication Data

US 2020/0149417 A1    May 14, 2020

(51) Int. Cl.

| F01D 25/24 | (2006.01) |
|---|---|
| F01D 5/20 | (2006.01) |
| F01D 11/08 | (2006.01) |
| F01D 9/04 | (2006.01) |
| F01D 25/26 | (2006.01) |
| F01D 11/18 | (2006.01) |

(52) U.S. Cl.
CPC ............... *F01D 5/20* (2013.01); *F01D 11/08* (2013.01); *F01D 9/04* (2013.01); *F01D 9/048* (2013.01); *F01D 11/18* (2013.01); *F01D 25/243* (2013.01); *F01D 25/246* (2013.01); *F01D 25/26* (2013.01); *F05D 2220/32* (2013.01); *F05D 2240/24* (2013.01); *F05D 2240/30* (2013.01); *F05D 2240/55* (2013.01)

(58) Field of Classification Search
CPC ...... F01D 25/26; F01D 25/243; F01D 25/246; F01D 11/18; F01D 11/08; F01D 9/04–048
See application file for complete search history.

(56) References Cited

U.S. PATENT DOCUMENTS

| 5,145,316 A * | 9/1992 | Birch .................. F01D 5/225 |
|---|---|---|
| | | 415/173.1 |
| 5,192,185 A | 3/1993 | Leonard |
| 5,232,340 A | 8/1993 | Morgan |
| 5,927,942 A | 7/1999 | Stahl et al. |

(Continued)

FOREIGN PATENT DOCUMENTS

| EP | 2612951 A2 | 7/2013 |
|---|---|---|
| EP | 3112606 A1 | 1/2017 |

(Continued)

OTHER PUBLICATIONS

EP Search Report dated Feb. 14, 2020 issued for corresponding European Patent Application No. 19197170.4.

(Continued)

*Primary Examiner* — Justin D Seabe
*Assistant Examiner* — Behnoush Haghighian
(74) *Attorney, Agent, or Firm* — Bachman & LaPointe, P.C.

(57) ABSTRACT

A blade outer air seal (BOAS) for a gas turbine engine includes a seal ring body having a radially inner face and a radially outer face that axially extend between a leading edge portion and a trailing edge portion and a segmented spline that extends from the radially outer face of the seal ring body, the seal secured to the radially inner face of the seal ring body.

16 Claims, 6 Drawing Sheets

(56) References Cited

U.S. PATENT DOCUMENTS

| | | | |
|---|---|---|---|
| 7,008,183 B2* | 3/2006 | Sayegh | F01D 9/04 415/173.1 |
| 7,147,429 B2 | 12/2006 | Czachor et al. | |
| 7,407,368 B2* | 8/2008 | Tanaka | F01D 9/04 415/173.1 |
| 7,771,160 B2* | 8/2010 | Shi | F01D 9/04 415/138 |
| 7,866,943 B2* | 1/2011 | Durand | F01D 25/246 415/173.1 |
| 8,181,555 B2* | 5/2012 | Clements | B23B 29/03489 82/70.2 |
| 8,439,629 B2 | 5/2013 | Pietraszkiewicz et al. | |
| 8,439,636 B1 | 5/2013 | Liang | |
| 8,511,975 B2 | 8/2013 | Shi et al. | |
| 8,550,768 B2* | 10/2013 | Montgomery | F01D 5/143 415/1 |
| 8,579,580 B2* | 11/2013 | Albers | F01D 25/246 415/173.1 |
| 8,651,497 B2 | 2/2014 | Tholen et al. | |
| 8,684,689 B2* | 4/2014 | Guo | F01D 11/08 415/213.1 |
| 8,740,552 B2* | 6/2014 | Marusko | F01D 9/04 415/173.1 |
| 8,753,073 B2* | 6/2014 | Albers | F01D 25/246 415/139 |
| 8,763,248 B2* | 7/2014 | Carrier | B23K 20/129 29/889.2 |
| 8,834,105 B2* | 9/2014 | Albers | F01D 11/005 415/173.1 |
| 8,834,106 B2* | 9/2014 | Luczak | F01D 11/12 415/173.3 |
| 8,905,709 B2* | 12/2014 | Dziech | F01D 11/005 415/173.1 |
| 8,998,573 B2* | 4/2015 | Albers | F01D 11/005 415/173.3 |
| 9,228,447 B2 | 1/2016 | McCaffrey | |
| 9,574,455 B2* | 2/2017 | McCaffrey | F01D 25/12 |
| 9,957,829 B2* | 5/2018 | Shepherd | F01D 11/14 |
| 9,976,435 B2 | 5/2018 | Borja et al. | |
| 9,988,934 B2 | 6/2018 | Spangler | |
| 10,041,369 B2* | 8/2018 | Blaney | F01D 25/28 |
| 10,323,534 B2* | 6/2019 | McCaffrey | F01D 11/24 |
| 10,443,615 B2* | 10/2019 | O'Toole | F04D 29/522 |
| 2005/0002780 A1 | 1/2005 | Tanaka | |
| 2005/0004810 A1 | 1/2005 | Tanaka | |
| 2007/0231132 A1* | 10/2007 | Durand | F01D 25/246 415/209.2 |
| 2009/0324350 A1* | 12/2009 | Clements | B23P 6/002 408/103 |
| 2012/0171027 A1* | 7/2012 | Albers | F01D 11/005 415/208.1 |
| 2012/0183394 A1* | 7/2012 | Guo | F01D 11/08 415/200 |
| 2013/0011248 A1* | 1/2013 | Croteau | F01D 9/04 415/200 |
| 2014/0017072 A1* | 1/2014 | McCaffrey | F01D 25/12 415/173.1 |
| 2014/0212273 A1* | 7/2014 | Le Borgne | F02C 7/045 415/119 |
| 2016/0010482 A1 | 1/2016 | Rogers et al. | |
| 2016/0153306 A1 | 6/2016 | Romanov et al. | |
| 2017/0122120 A1* | 5/2017 | McCaffrey | F01D 11/127 |
| 2017/0284225 A1* | 10/2017 | Hashimoto | F01D 25/14 |
| 2017/0292398 A1 | 10/2017 | Wasserman et al. | |
| 2018/0080345 A1* | 3/2018 | Debray | F01D 25/162 |
| 2018/0142564 A1 | 5/2018 | Taglieri et al. | |
| 2018/0202306 A1 | 7/2018 | Hudson et al. | |
| 2018/0363486 A1* | 12/2018 | Smoke | F01D 25/246 |
| 2018/0363499 A1* | 12/2018 | Smoke | F01D 11/08 |
| 2020/0103036 A1 | 4/2020 | Davis | |
| 2020/0149417 A1 | 5/2020 | McCaffrey | |
| 2020/0158022 A1 | 5/2020 | McCaffrey | |
| 2020/0158023 A1 | 5/2020 | McCaffrey | |

FOREIGN PATENT DOCUMENTS

| | | |
|---|---|---|
| EP | 3351732 A1 | 7/2018 |
| EP | 3351740 A1 | 7/2018 |
| GB | 2239678 A | 7/1991 |
| GB | 2486964 A | 7/2012 |
| WO | 2014152209 A1 | 9/2014 |
| WO | 2015020708 A2 | 2/2015 |
| WO | 2015021029 A1 | 2/2015 |

OTHER PUBLICATIONS

EP Search Report dated Mar. 23, 2020 issued for corresponding European Patent Application No. 19198435.0.
U.S. Non-final Office Action dated Jun. 22, 2020 issued for corresponding U.S. Appl. No. 16/194,857.
U.S. Non-final Office Action dated Jul. 1, 2020 issued for corresponding U.S. Appl. No. 16/194,852.

* cited by examiner

BLADE OUTER AIR SEAL WITH NON-LINEAR RESPONSE

U.S. GOVERNMENT RIGHTS

This invention was made with Government support under contract W58RGZ-16-C-0046 awarded by the United States Army. The Government has certain rights in the invention.

BACKGROUND

The present disclosure relates generally to a gas turbine engine, and more particularly to a blade outer air seal (BOAS) that may be incorporated into a gas turbine engine.

Gas turbine engines include a compressor that compresses air, a combustor that burns the compressed air, and a turbine across which the combustion gases are expanded. The expansion of the combustion gases drives the turbine, which in turn drives rotation of a power turbine and the compressor.

An engine casing of an engine static structure may include one or more blade outer air seals (BOAS) that provide an outer radial flow path boundary for the hot combustion gases. The BOAS surround respective rotor assemblies that rotate and extract energy from the hot combustion gases. The BOAS may be subjected to relatively intense temperatures during gas turbine engine operation.

In order to increase efficiency, a clearance between the blade tips of the rotor assemblies and the outer radial flow path boundary is relatively small. This ensures that a minimum amount of air passes between the blade tips and the outer radial flow path boundary. The abradable BOAS further reduces the tip clearance as the blade tips are designed to, at times, rub against the BOAS. The rubbing wears the abradable material such that the blade tips then have an increased tip clearance relative to the idealized geometry.

Leakage at the tip clearance is a ratio between the gap between the tip shroud and the overall size of the flow path such that the smaller the engine the larger the percentage that the tip clearance is relative to the whole flow. Relatively small engines are thus much more sensitive to tip clearance than larger engines. The lowest leakage design is a full-hoop ring; however, a full ring complicates design of a tight tip clearance in a power turbine because the BOAS grows more in radius than do the blades.

SUMMARY

A blade outer air seal (BOAS) for a gas turbine engine according to one disclosed non-limiting embodiment of the present disclosure includes a seal ring body having a radially inner face and a radially outer face; a segmented spline that extends from the radially outer face of the seal ring body; and a seal secured to the radially inner face of the seal ring body.

A further aspect includes that the seal is a honeycomb seal.

A further aspect of the present disclosure includes a thermal barrier coating applied to at least a portion of a radially inner face of the seal.

A further aspect includes that the seal is brazed to the radially inner face.

A further aspect includes that the seal ring body forms a full ring hoop.

A further aspect includes that the segmented spline selectively abuts an engine casing.

A further aspect includes that the segmented spline selectively abuts a pad on an engine casing.

A further aspect includes that the segmented spline controls a purge airflow between the radially outer face and an engine casing.

A further aspect includes that the seal ring body axially extends between a leading edge portion and a trailing edge portion.

A further aspect includes that the seal extends at least partially between the leading edge portion and the trailing edge portion.

A further aspect includes that the segmented spline selectively abuts a power turbine engine casing of a turboshaft engine.

A non-linear response system according to one disclosed non-limiting embodiment of the present disclosure includes a turbine rotor along an axis; an engine casing comprising a pad at least partially around the axis; and a blade outer air seal (BOAS) with a segmented spline that extends from a radially outer face of a full hoop seal ring body to selectively contact the pad to provide a non-linear thermal response of the blade outer air seal (BOAS) with respect to the turbine rotor.

A further aspect includes that the blade outer air seal (BOAS) comprises a honeycomb seal that extends radially inward from the full hoop seal ring body.

A further aspect includes that the turbine rotor comprises rotor blades with knife edges that interface with the honeycomb seal.

A further aspect includes that the pad is a machined surface.

A further aspect includes that the engine casing is a turbine exhaust case.

A method of controlling a specific rate of thermal change to match a corresponding blade design with a blade outer air seal (BOAS) for a gas turbine engine according to one disclosed non-limiting embodiment of the present disclosure includes selectively abutting a segmented spline that extends from the radially outer face of a seal ring body with an engine casing to provide a non-linear thermal response.

A further aspect of the present disclosure includes controlling a purge airflow between the radially outer face and the engine casing.

A further aspect of the present disclosure includes controlling the airflow through slots in the segmented spline.

A further aspect of the present disclosure includes abutting the segmented spline that extends from the radially outer face of the seal ring body with a pad machined within the engine casing.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
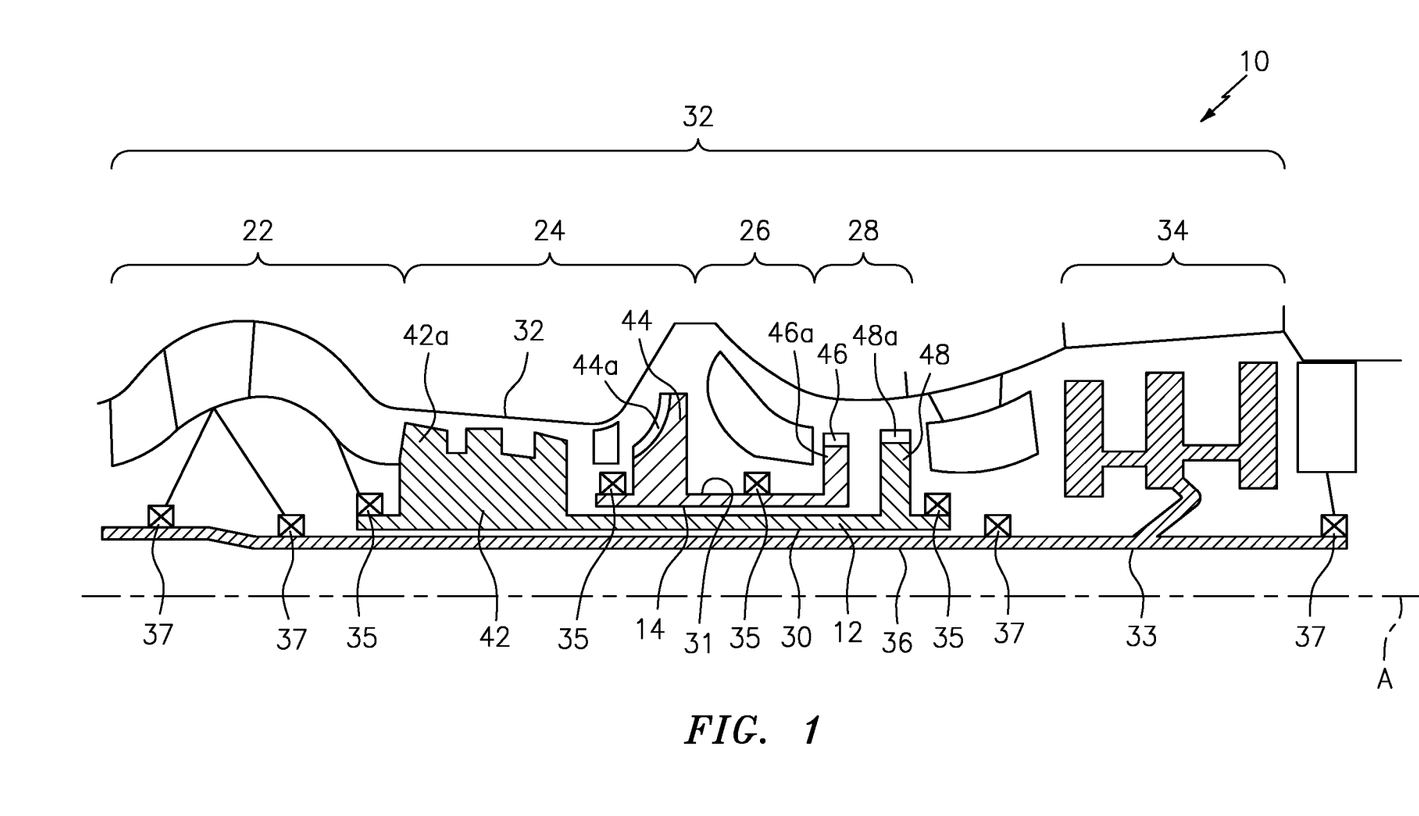
FIG. 1 illustrates an example turboshaft gas turbine engine.

FIG. 1 schematically illustrates a gas turbine engine 10. In this embodiment, the engine 10 is a three-spool turboshaft engine, such as for a helicopter with a low spool 12, a high spool 14 and a power turbine spool 33 mounted for rotation about an engine central longitudinal axis A. The engine 10 includes an inlet duct section 22, a compressor section 24, a combustor section 26, a turbine section 28, and a power turbine section 34.

The compressor section 24 includes a low pressure compressor 42 with a multitude of circumferentially-spaced blades 42a and a centrifugal high pressure compressor 44 a multitude of circumferentially-spaced blades 44a. The turbine section 28 includes a high pressure turbine 46 with a multitude of circumferentially-spaced turbine blades 46a and a low pressure turbine 48 with a multitude of circumferentially-spaced blades 48a. The low spool 12 includes an inner shaft 30 that interconnects the low pressure compressor 42 and the low pressure turbine 48. The high spool 14 includes an outer shaft 31 that interconnects the high pressure compressor 44 and the high pressure turbine 46.

The low spool 12 and the high spool 14 are mounted for rotation about the engine central longitudinal axis A relative to an engine static structure 32 via several bearing systems 35. The power turbine spool 33 is mounted for rotation about the engine central longitudinal axis A, relative to the engine static structure 32 via several bearing systems 37.

The compressor section 24 and the turbine section 28 drive the power turbine section 34 that drives an output shaft 36. In this example engine, the compressor section 24 has five stages, the turbine section 28 has two stages and the power turbine section 34 has three stages. During operation, the compressor section 24 draws air through the inlet duct section 22. In this example, the inlet duct section 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28 which rotationally drives the compressor section 24. The hot gas stream exiting the turbine section 28 further expands and drives the power turbine section 34 and the output shaft 36. The compressor section 24, the combustor section 26, and the turbine section 28 are often referred to as the gas generator, while the power turbine section 34 and the output shaft 36 are referred to as the power section. The gas generator section generates the hot expanding gases to drive the power section. Depending on the design, the engine accessories may be driven either by the gas generator or by the power section. Typically, the gas generator section and power section are mechanically separate such that each rotate at different speeds appropriate for the conditions, referred to as a 'free power turbine.'

Figure 2:
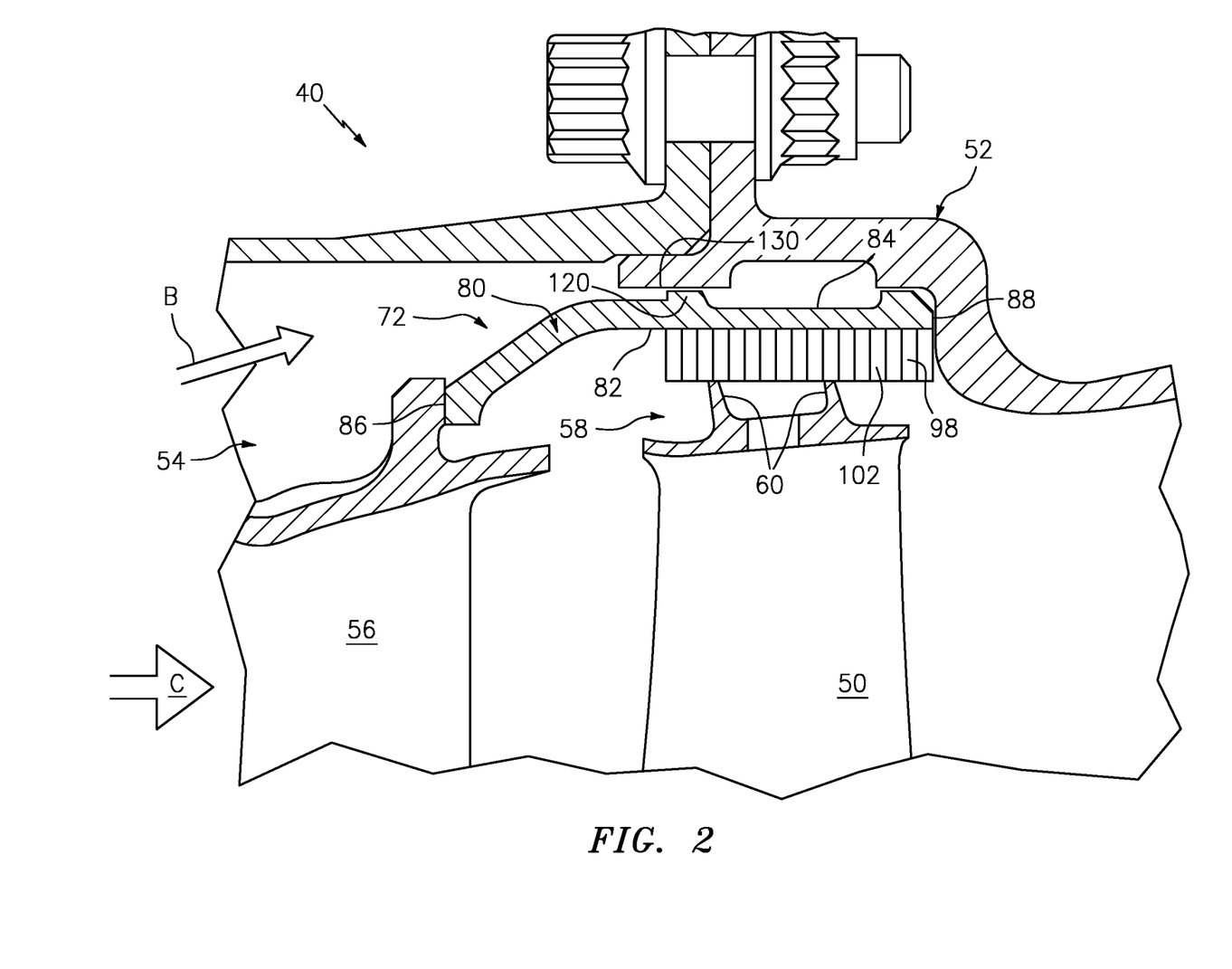
FIG. 2 illustrates a power turbine stage of the gas turbine engine with a blade outer air seal that provides a non-linear thermal response.

FIG. 2 illustrates an engine stage of the gas turbine engine 10. In this example, the engine stage represents a portion of the power turbine section 34. However, it should be appreciated that other engine sections and architectures will benefit herefrom. In this example, a blade 50 such as the turbine blade (only one shown, although a plurality of blades are circumferentially disposed about a rotor disk) is mounted for rotation relative to an outer casing 52 of the static structure 32. The engine stage 40 also includes a vane ring 54 supported within the casing 52 upstream from the blade 50. The vane ring 54 contains one or more vanes 56 that prepare the airflow for the blades.

The blade 50 includes a blade tip 58 that is located at a radially outermost portion of the blade 50. In this exemplary embodiment, the blade tip 58 includes a knife edge 60 that extends toward a blade outer air seal (BOAS) 72. The BOAS 72 establishes an outer radial flow path boundary of the core flow path C. The knife edge 60 and the BOAS 72 cooperate to limit airflow leakage around the blade tip 58. The BOAS 72 is disposed in an annulus radially between the casing 52 and the blade tip 58. Although this particular embodiment is illustrated in a cross-sectional view, the BOAS 72 may form a full ring hoop assembly that circumscribes associated blades 50 of a stage. Purge airflow B injected into the annular cavity formed by the casing 52 and the BOAS 72.

The BOAS 72 of this exemplary embodiment is a full ring that can be circumferentially disposed about the engine centerline longitudinal axis A. The BOAS 72 includes a seal ring body 80 having a radially inner face 82 and a radially outer face 84. Once positioned within the gas turbine engine 20, the radially inner face 82 is directed toward the blade tips 58 (i.e., the radially inner face 82 is positioned on the core flow path side) and the radially outer face 84 faces the casing 52 (i.e., the radially outer face 84 is positioned on the non-core flow path side). The radially inner face 82 and the radially outer face 84 axially extend between a leading edge portion 86 and a trailing edge portion 88.

In one exemplary embodiment, the BOAS 72 is made of a material having a relatively low coefficient of thermal expansion such as a nickel-chromium-iron-molybdenum alloy or other material that possesses a desired combination of oxidation resistance, fabricability and high-temperature strength. Example materials include, but are not limited to, Mar-M-247, Hastaloy N, Hayes 242, IN792+Hf, HASTELLOY® X alloy (UNS N06002 (W86002). Other materials may also be utilized within the scope of this disclosure.

A seal 98 is located on the radially inner face 82 of the seal ring body 80. The seal 98 can be brazed to the radially inner face 82 or could be attached using other known attachment techniques. In one example, the seal 98 is a honeycomb seal that interacts with the blade tip 58. A thermal barrier coating 102 can also be applied to at least a portion of the radially inner face 82 and/or the seal 98. The thermal barrier coating 102 could also partially or completely fill the seal 98 of the BOAS 72. The thermal barrier coating 102 may also be deposited on any flow path connected portion of the BOAS 72 to protect the underlying substrate of the BOAS 72 from exposure to hot gas, reducing thermal fatigue and to enable higher operating conditions. A suitable low conductivity thermal barrier coating 102 can be used to reduce the heat transfer from the core flow path C to the airflow B.

Figure 3:
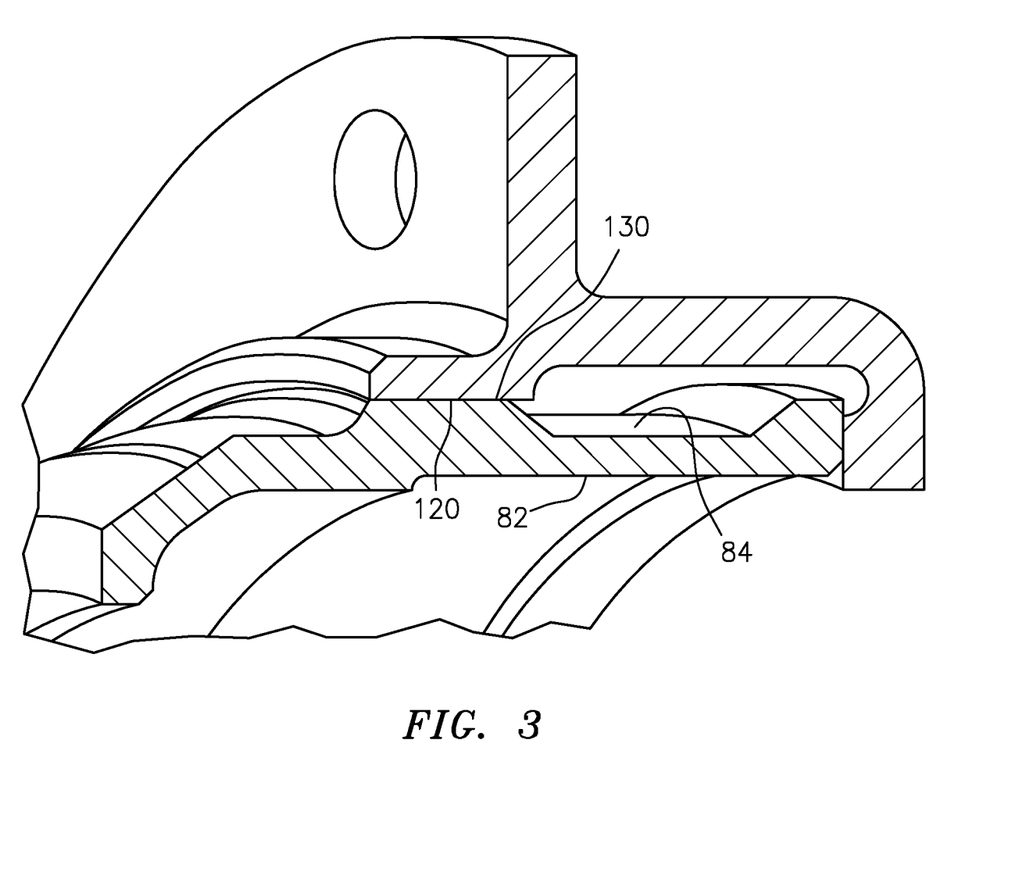
FIG. 3 illustrates a partial sectional view of the blade outer air seal.

The radially outer face 84 of the seal ring body 80 includes a segmented spline 120 (also shown in FIGS. 3 and 4) that selectively interfaces with, in one embodiment, a pad 130 that extends radially inward from the casing 52, e.g., the turbine exhaust case of the power turbine. The pad 130 may be a full hoop surface or a segmented surface machined at one or more locations into the casing 52. The pad 130 provides a close tolerance location for interface with the segmented spline 120. The spacing between the segmented spline 120 and the pad 130 is set at assembly to provide a tightly controlled clearance that sets the non-linear thermal expansion response. That is, the interface between the pad 130 and the segmented spline 120 provides a tolerance-controlled interface between the BOAS 72 and the casing 52 such that interaction therebetween generates a non-linear thermal response for improved tip clearance control.

The segmented spline 120 includes slots 122 (FIG. 4) to permit communication of the purge airflow B between the seal ring body 80 and the casing 52. In one example, the segmented spline 120 extends radially outward about 0.04-0.06 inches (1.02-1.5 mm) on a stage of the power turbine to provide an assembly gap of 0.005-0.020 inches (0.127-0.508 mm) within the turbine exhaust case which results in a 0.01-0.03 inch (0.025-0.08 mm) running gap that is reduced by 0.003-0.02 inches (0.076-0.5 mm) from conventional.

Figure 5:
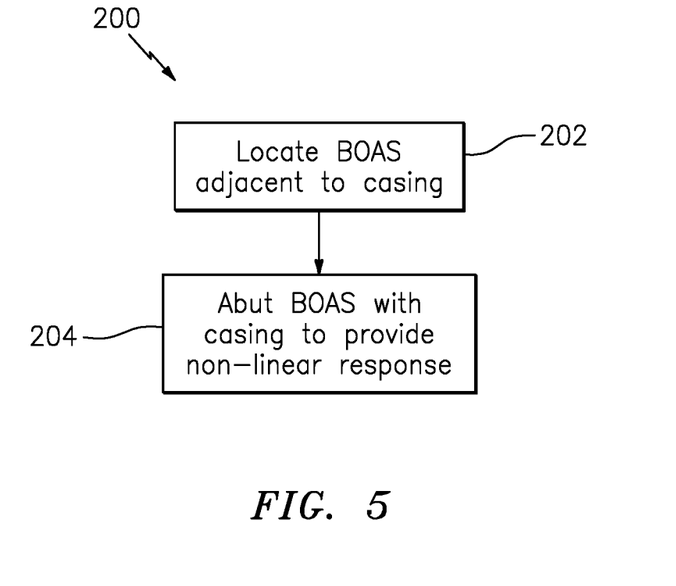
FIG. 5 illustrates a method of operating the gas turbine engine with the blade outer air seal that provides a non-linear thermal response.

With reference to FIG. 5, a method 200 of controlling a specific rate of thermal change to match a corresponding blade design with the BOAS initially includes locating the segmented spline 120 that extends from the radially outer face 84 of the seal ring body 80 with the pad 130 on the casing 52 (202). Then, in response to engine acceleration selectively abutting the segmented spline 120 with the casing 52 to provide a non-linear thermal response (204).

Figure 6:
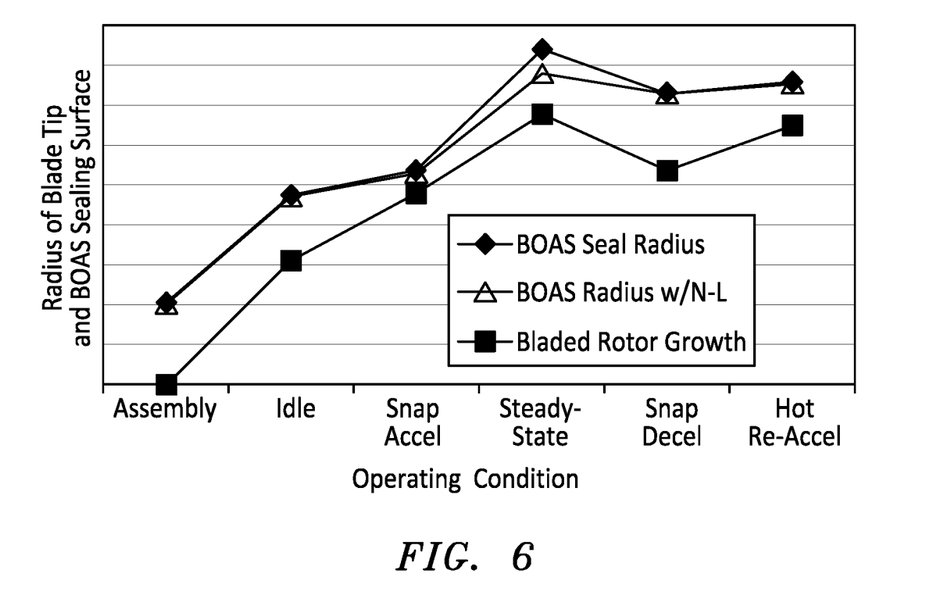
FIG. 6 is a plot of engine operating conditions with respect to a radius of the blade tips and the BOAS sealing surface comparing conventional with a non-linear response system that provides a non-linear thermal response.
Figure 7:
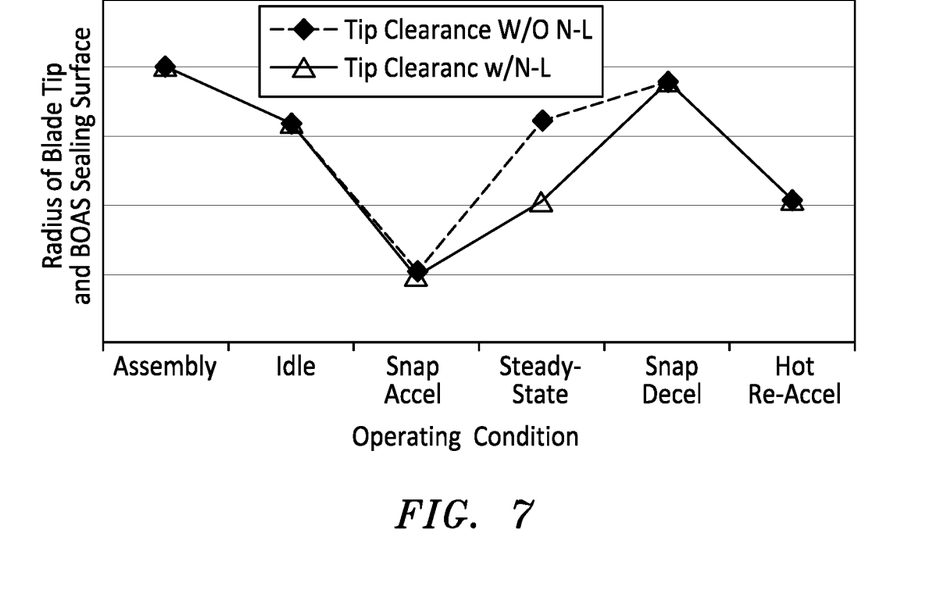
FIG. 7 is a plot of engine operating conditions with respect to a running clearance between the blade tips and the BOAS comparing conventional with a non-linear response system that provides a non-linear thermal response.

With reference to FIG. 6 and FIG. 7, during engine operation, the BOAS 72 thermally expands freely and relatively rapidly in response to an engine acceleration event until the segmented spline 120 contacts the pad 130. Once this occurs, the casing 52 operates as a backstop to change, e.g., reduce, the radial growth of the seal ring body 80. That is, the continued thermal expansion of the seal ring body 80 loads into casing 52 such that the seal ring body 80 is in compression and the seal ring body 80 and casing 52 provide an increased thermal mass that grows thermomechanically at a different rate than if the seal ring body 80 were free to thermally expand alone. A benefit of this is that the BOAS 72 essentially moves out of the way, then reaches a steady state with the casing 52 so the rotor system can then catch up to provide a relatively tighter tip clearance at high power. The seal ring body 80 has to first unload the casing 52 before the seal ring body 80 moves freely inward.

The operational tip clearance is measured between the outer most sealing surface of the blade 50 (e.g., knife edge 60), and the BOAS 72 directly opposite. Two types of event classically cause the minimum tip clearance: Hot re-accel Pinch Point (Transient); and Accel Pinch Point (Transient) Any contact (rub) between the blade 50 tip and BOAS 72 will result in material removal from one or both, such that the resulting tip clearance is permanently increased by the magnitude of the material removed. Once the rub event has taken place, the operating clearances vary, just as they would without rub, except there is a permanent "adder" of increased clearance to all subsequent operating conditions, including cold assembly. Full hoop BOAS 72 rings grow primarily due to temperature. The pressure gradient on the full hoop BOAS 72 does not result in significant mechanical stretch or compression. If the full hoop BOAS 72 expands, and contacts the outer the casing 52 structure, then the BOAS 72 expansion will no longer be solely thermally driven. Once the BOAS 72 make contact with the outer the casing 52, the expansion becomes controlled by the thermal expansion of both the casing 52 and the BOAS 72 and the relative interference force and subsequent mechanical growth, dictated by the stiffness of each. This behavior is non-linear vs. BOAS 72 metal temperature Also, once the BOAS 72 cools down sufficiently, it will disengage from the outer the casing 52 and resume a solely thermally driven response behavior.

At assembly and idle there is a gap between the BOAS 72 and the outer the casing 52 and the BOAS 72 growth is controlled by thermals.

During a snap acceleration to high power, the blade 50 and disk expands quickly due to centrifugal load. Additionally, the blade 50 grows radially, quickly due to direct exposure to the gaspath temperature, however the disk responds very slowly because it is shielded from the gaspath. The BOAS 72 typically responds slower than the blade 50 because only one side is exposed to the gaspath. The radial difference between growth of the rotor and BOAS 72 typically decreases to a point where there is little to no gap and this is referred to as the "accel pinch point". If the initial gap build clearance is too small, a blade 50 to BOAS 72 rub will occur, and a new clearance is effectively established during the "pinch point." Additional rub after this initial event is unlikely. With the disclosed non-linear response system, the BOAS 72 may begin to contact the outer the casing 52 during the accel pinch point, and would be included in the assessment of the pinch point and potential for blade 50 rub.

When the engine operates at power for a relatively long time period such as cruise flight, the rotor reaches the largest radius. The disk and blade 50 are at their hottest and the maximum mechanical growth occurs due to RPM and material properties. An uncooled, which is typical of power turbines, BOAS 72, being exposed to high velocity core flow, reaches near equilibrium with the gaspath temperature, and thermally expands more than the combined blade 50 and disk thermal and mechanical growth. Typically, the steady state running tip clearance is large at power, negatively affecting efficiency and fuel burn. Alternatively, when the BOAS 72 and the casing 52 are at their hottest condition, and the design is created where the BOAS 72 contacts the outer the casing 52, then the outer casing 52 will constrain the thermal growth of the BOAS 72, then this results in a smaller running tip clearance.

The non-linear behavior results in a reduced tip clearance and improved turbine performance, and reduction in specific fuel consumption (SFC). During a snap deceleration in a constant speed helicopter engine, there is no RPM based change in mechanical stress/growth: the blades 50 cool down very quickly, but the rotor disk does not. The blade 50 thermally "pulls" away from the BOAS 72. The BOAS 72 cools down at a slower rate than the blade 50. Conventional BOAS shrinks based upon the change in temperature non-linear BOAS 72 also cools down a similar magnitude, but, because the initial radial growth was constrained by the out the casing 52: it first shrinks and reduced the interference load with the outer the casing 52. Once the interference is eliminated the BOAS 72 shrinks according to thermal only. Both the conventional BOAS 72 and non-linear BOAS 72 shrink to the near identical radius. Non-linear affects the range of radial growth from cold assembly, and the timing of the radius change. On a Hot Re-accel, the blade 50 quickly regrows and the BOAS 72 begins to re-grow and re-contact the outer the casing 52. Initially, on a hot re-accel the BOAS 72 may not contact the outer the casing 52 and the running clearance is identical to a conventional BOAS 72 system. However, as time at power is accumulated, the non-linear behavior reengages and results in the restoration of the smaller running tip clearance. The design of the BOAS 72 and the casing 52 requires particular attention to the transient thermals, relative strength, stiffness, and material choice in order to create a non-linear system that achieve this desired behavior: reduce tip clearance at power; and avoid addition accel or hot-re-accel pinch (rub).

Figure 4:
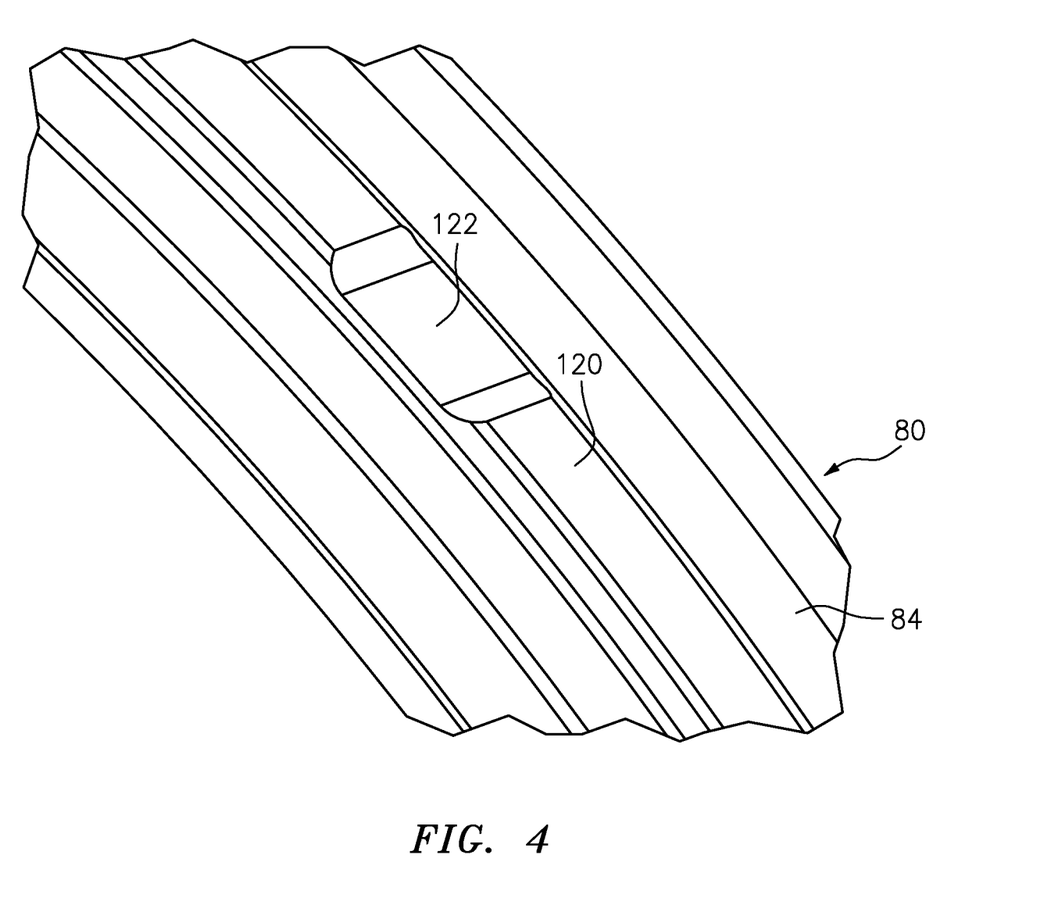
FIG. 4 illustrates a top perspective view of a seal ring body of the blade outer air seal.

The non-linear thermal response permits tailoring of BOAS expansion and contraction to more closely follow that of the rotor. By limiting the radial motion to a non-linear response, the tip clearance is more closely controlled. Material choice may be used to set the radial clearance and obtain the desired non-linear response. In addition, the slots 122 permit control of the purge airflow B along the BOAS 72 to further control the response rate. The slots 122 can also be circumferentially located to assure that the BOAS 72 responds uniformly about the circumference. In another embodiment, the segmented splines 120, seal ring body 80, and the pads 130 may be modified in material thickness to change the transient response rate of the part by changing the thermal mass.

Typically, full hoop BOAS are allowed to grow independent of the external casing. It was found by analysis that a close-fitting gap, between the BOAS and the casing provides a non-linear thermal response for improved tip clearance. The full hoop ring BOAS grows until it contacts the outer casing. At that point the combined thermal and structural deflection of the combined BOAS and casing limit the additional radial growth. By adding a non-linear response, the tip clearance is reduced at high power resulting in overall increased power turbine efficiency and power output.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The elements described and depicted herein, including in flow charts and block diagrams throughout the figures may show logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A blade outer air seal (BOAS) for a gas turbine engine, comprising:
    a full ring hoop seal ring body having a radially inner face and a radially outer face;
    a honeycomb seal secured to the radially inner face of the seal ring body adjacent to a turbine rotor; and
    a segmented spline that extends radially outward from the radially outer face of the seal ring body, the segmented spline comprises slots to permit communication of a purge airflow between the radially outer face and a turbine exhaust case, a spacing between the segmented spline and a machined pad on the turbine casing set at assembly to provide a tolerance-controlled interface between the BOAS and the turbine casing that sets the non-linear thermal expansion response of the blade outer air seal (BOAS) with respect to the turbine rotor during engine operation
    a seal secured to the radially inner face of the seal ring body.

2. The blade outer air seal (BOAS) as recited in claim 1, further comprising a thermal barrier coating applied to at least a portion of a radially inner face of the seal.

3. The blade outer air seal (BOAS) as recited in claim 1, wherein the seal is brazed to the radially inner face.

4. The blade outer air seal (BOAS) as recited in claim 1, wherein the radially inner face and the radially outer face of the seal ring body axially extends between a leading edge portion and a trailing edge portion.

5. The blade outer air seal (BOAS) as recited in claim 4, wherein the honeycomb seal extends at least partially between the leading edge portion and the trailing edge portion.

6. The blade outer air seal (BOAS) as recited in claim 1, wherein the segmented spline abuts a power turbine engine casing of a turboshaft engine.

7. A non-linear response system, comprising:
    a turbine rotor along an axis;

a turbine exhaust case comprising a pad at least partially around the axis; and a blade outer air seal (BOAS) with a segmented spline that extends radially outward from a radially outer face of a full hoop seal ring body and a honeycomb seal secured to the radially inner face of the seal ring body adjacent to the turbine rotor, the segmented spline includes slots to permit communication of a purge airflow between the radially outer face and the turbine exhaust case, a spacing between the segmented spline and the pad on the turbine casing set at assembly to provide a tolerance-controlled interface between the BOAS and the turbine casing that sets the non-linear thermal expansion response of the blade outer air seal (BOAS) with respect to the turbine rotor during engine operation.

8. The non-linear response system in claim 7, wherein the blade outer air seal (BOAS) comprises a honeycomb seal that extends radially inward from the full hoop seal ring body.

9. The non-linear response system in claim 8, wherein the turbine rotor comprises rotor blades with knife edges that interface with the honeycomb seal.

10. The non-linear response system in claim 7, wherein the pad is a machined surface.

11. A method of controlling a specific rate of thermal change to match a corresponding blade design with a blade outer air seal (BOAS) for a gas turbine engine, comprising:

setting a spacing between a segmented spline that extends radially outward from a radially outer face of a full hoop seal ring body and a machined pad on a turbine casing at assembly to provide a tolerance-controlled interface between a blade outer air seal (BOAS) and the turbine casing that sets a predefined non-linear thermal expansion response of the blade outer air seal (BOAS) with respect to the turbine rotor;

securing a honeycomb seal to a radially inner face of the seal ring body adjacent to the turbine rotor; and selectively abutting the segmented spline that extends from the radially outer face of a full hoop seal ring body with the machined pad during engine operation resulting in the non-linear thermal expansion response reducing a tip clearance between the turbine rotor and the honeycomb seal of the blade outer air seal (BOAS).

12. The method as recited in claim 11, further comprising controlling a purge airflow between the radially outer face and the engine casing.

13. The method as recited in claim 12, further comprising controlling the airflow through slots in the segmented spline.

14. The blade outer air seal (BOAS) as recited in claim 1, wherein the pad is machined into the turbine exhaust casing.

15. The blade outer air seal (BOAS) as recited in claim 1, wherein the honeycomb seal interfaces with a knife edge that extends from a blade tip of the turbine rotor.

16. The blade outer air seal (BOAS) as recited in claim 1, wherein the segmented spline extends radially outward about 0.04-0.06 inches (1.02-1.5 mm) to provide an assembly gap of 0.005-0.020 inches (0.127-0.508 mm) within the turbine exhaust case which results in a 0.01-0.03 inch (0.025-0.08 mm) running gap during operation.

* * * * *